United States Patent [19]
Sato

[11] 4,035,714
[45] July 12, 1977

[54] ALTERNATING CURRENT GENERATOR

[75] Inventor: Suguru Sato, Ohbu, Japan

[73] Assignee: Nippondenso Co., Ltd., Kariya, Japan

[21] Appl. No.: 559,599

[22] Filed: Mar. 18, 1975

[30] Foreign Application Priority Data

Mar. 20, 1974 Japan .............................. 49-31653
Apr. 11, 1974 Japan .............................. 49-41209

[51] Int. Cl.² .................................... H02P 9/10
[52] U.S. Cl. .................................. 322/28; 322/59; 322/86
[58] Field of Search .............. 320/64, 68; 322/59, 322/86, 87, 28, 61; 310/68 D

[56] References Cited
U.S. PATENT DOCUMENTS 3,324,383  6/1967  Raver .............................. 322/28 X
3,641,374  2/1972  Sato ................................ 357/76 X

*Primary Examiner*—Robert J. Hickey
*Attorney, Agent, or Firm*—Cushman, Darby & Cushman

[57] ABSTRACT

A pair of diodes, which has an input terminal connected with a neutral point of a Y-connected output winding of an alternating current generator, is provided in addition to a full-wave bridge rectifier connected across a battery. A field winding of the alternating current generator is supplied with filed current from the battery or the full-wave bridge rectifier and further from the pair of diodes which are energized by the voltage appearing at the neutral point. The field current supply from the pair of diodes is not limited by a voltage regulator for controlling the output voltage of the generator, whereby a large increase of output power of the generator can be obtained.

11 Claims, 5 Drawing Figures

ALTERNATING CURRENT GENERATOR

BACKGROUND OF THE INVENTION

1. Field of the Invention

The present invention relates to an alternating current generator for charging a storage battery mounted on a motor vehicle.

2. Description of the Prior Art

In a conventional alternating current generator as exemplified om U.S. Pat. No. 3,641,374, a three-phase full-wave bridge rectifier network is connected with a Y-connected three-phase output winding at its AC input terminals and further a pair of diodes is connected with a neutral point of the output winding at its AC input terminal for providing direct current output terminals in combination with the bridge rectifier network, across which a storage battery is connected, whereby the output power is relatively increased in comparison with an alternating current generator having only a full-wave bridge rectifier network.

However, since, as a recent tendency, numerous electrical equipment for emission control as well as safety driving is required to be installed in a motor vehicle, it is still insufficient for the motor vehicle to provide by such generator the required electric power for charging the storage battery and supplying the other electrical loads.

SUMMARY OF THE INVENTION

It is, therefore, a primary object of the present invention to provide an alternating current generator which relative to the prior art, is capable of increasing its output voltage.

It is another object of the present invention to provide an alternating current generator which is simple in construction and lower in cost.

DESCRIPTION OF THE PREFERRED EMBODIMENTS

Figure 1:
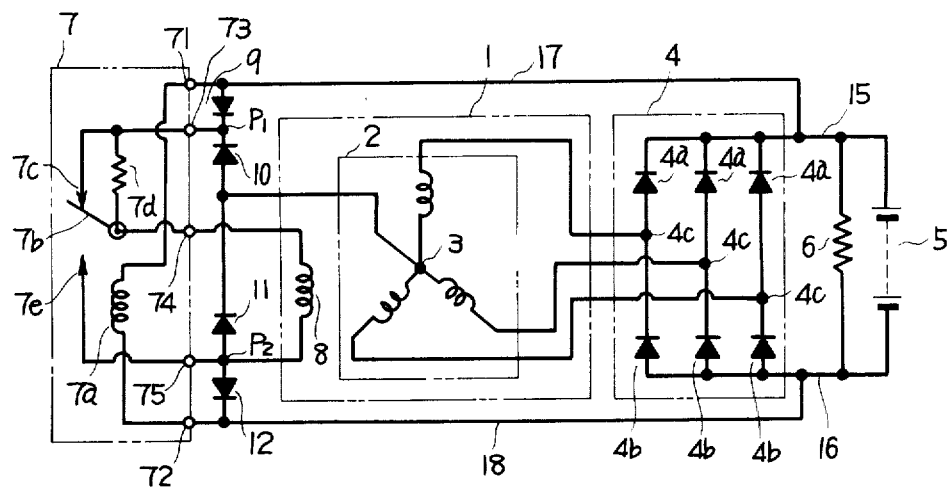
FIG. 1 is an electric circuit diagram showing a first embodiment according to the present invention.

Referring now to FIG. 1 showing a first embodiment, an alternating current generator 1 (hereinafter referred to as an AC generator) includes a Y-connected three-phase output winding 2 and a field winding 8. A three-phase full-wave bridge rectifier network 4 includes positive diodes 4a, negative diodes 4b and A.C. input terminal 4c connected with the output winding 2. The cathodes of the positive diodes 4a are connected with a storage battery 5 at its positive terminal and the other electrical loads 6 on a motor vehicle through a power supply conductor 15 and the anodes of the negative 4b are connected with a negative terminal of the battery 5 through a negative conductor 16, whereby the voltage developed between the power supply conductor 15 and the negative conductor 16 is utilized to charge the storage battery 5 and also to supply the other electrical loads 6 with electric power.

The field winding 8 controls the output voltage of the AC generator 1. As current through the field winding 8 increases the output voltage of the AC generator increases and when this current is reduced the output voltage thereof decreases. A voltage regulating system 7, which is described hereinafter, controls the field current to maintain a substantially constant output voltage from the AC generator 1.

In this figure, the voltage regulating system 7 is shown as a contact type, however it can be, of course, of a transistor type. This regulating system has positive and negative terminals 71 and 72 which are respectively connected with the power supply conductor 15 and the negative conductor 16 through positive and negative cables 17 and 18. The regulating system 7 further includes first and second power supply terminals 73 and 74 and a fifth terminal 75. A voltage sensing winding 7a which controls movable contactor 7b, is connected between the positive and negative terminals 71 and 72 for producing an electromotive force in response to a voltage applied thereto. A first stationary contactor 7c is connected with the first power supply terminal 73 and also intermittently with the second power supply terminal 74 through movable contactor 7b only when the movable contactor 7b is in contact with the first stationary contactor 7c. A current limiting resistor 7d is connected between the first and second power supply terminals 73 and 74. A second stationary contactor 7e is connected with the fifth terminal 75. The first power supply terminal 73 is connected with the positive cable 17 through a cathode-anode path of a first diode 9 and also with a neutral point of the Y-connected output winding 2 through a cathode-anode path of a second diode 10. The second power supply terminal 74 is connected with one end of the field winding 8 and the fifth terminal 75 is connected with the other end of the field winding 8, with the neutral point through an anode-cathode path of a third diode 11 and also with the negative cable 18 through an anode-cathode path of a fourth diode 12.

The operation of the AC generator constructed above will now be described. The movable contactor 7b is normally in contact with the first stationary contactor 7c. When a main switch (not shown) is closed the field winding 8 is supplied with current from the battery 5 through the series circuit of the positive cable 17, the first diode 9, the first stationary contactor 7c, the movable contactor 7b, the field winding 8, the fourth diode 12 and the negative cable 18, thereby to complete the initial excitation for the AC generator.

At the same time the voltage sensing winding 7a is supplied with current from the battery 5 through the positive and negative terminals 71 and 72, but this does not produce sufficient electromotive force to separate the movable contactor 7b from the first stationary contactor 7c.

When an engine (not shown) starts to rotate, the AC generator fixed thereto is driven to generate an alternating current which is rectified through the full-wave rectifier network 4, and which is supplied to the battery 5 and the other electrical loads 6.

When the voltage applied across the voltage sensng winding 7a exceeds a predetermined value, the electromotive force produced thereat becomes sufficient to separate the movable contactor 7b from the first stationary contactor 7c and in turn to drive it into engagement with the second stationary contactor 7e causing the field winding 8 to be short circuited. When this occurs, the current flowing through the field winding 8 is reduced because its short circuit forces the current from the diodes 9 to flow only through the limitng resistor 7d and the contactor 7e to the diode 12, thereby resulting in the decrease of the output voltage of the AC generator 1. And when the voltage applied to the voltage sensing winding 7a decreases below the predetermined value, the movable contactor 7b is again engaged with the first stationary contactor 7c , to thereby increase the output of the AC generator again. Repeating the above operation the output voltage of the AC generator 1 is controlled at a desired level.

A further detailed description will be made regarding the increase of the output of the AC generator. The voltage appearing at the neutral point 3 shown versus time $t$ in FIG. 2, in which a letter E designates an exemplary value of the desired regulated level of the AC generator, that is, the positive battery voltage. It should be noted from this figure that the voltage appearing at the neutral point 3 becomes intermittently higher than the positive battery voltage E and lower than the voltage at the negative battery voltage, which is shown by hatching.

Figure 2:
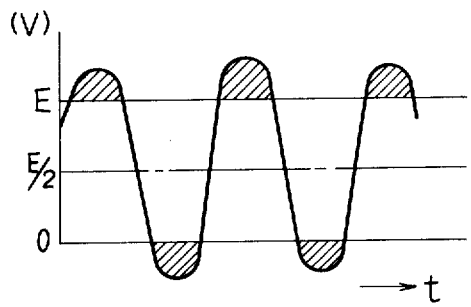
FIG. 2 is a waveform diagram of a voltage appearing at a neutral point in the respective circuit of FIGS. 1, 4 and 5.

It should be also noted here that the curve showing the voltage at the neutral point in FIG. 2 is the voltage measured in a condition of no load across points $P_1$ and $P_2$.

When the rotational speed of the AC generator 1 is below a predetermined number, the voltage appearing at the neutral point 3 does not become higher than the positive battery voltage or lower than the negative battery voltage. Accordingly, during this period no additional current flows to the field winding i.e. 8 through the diodes 10 and 11, and the power supply to the field winding 8 is carried only through the diodes 9 and 12 from the battery 5.

However, when the rotational speed of the AC generator 1 exceeds the predetermined number, the voltage appearing at the neutral point 3 becomes intermittently higher than the positive battery voltage and lower than the negative battery voltage as described before and as indicated in FIG. 2. The voltage sensing winding 7a senses the voltage across the battery 5 so that ON-OFF operation of the movable contactor 7b has no direct relation with the voltage appearing at the neutral point 3.

When the voltage at the neutral point 3 becomes higher than the positive battery voltage under the condition that the movable contactor 7b remains engaged with the first stationary contactor 7c , the current flow from the neutral point 3 through the diode 10, the point $P_1$ , the first stationary contactor 7c , the movable contactor 7b , the field winding 8, the diode 12, the negative cable 18, the negative diodes 4b of the full-wave bridge rectifier network 4 and A.C. input terminals 4c thereof to the output winding 2.

Further, when the voltage at the neutral point 3 becomes lower than the negative battery voltage under the condition that the movable contactor 7b remains engaged with the first stationary contactor 7c , the current flows from the neutral point 3 through the output winding 2, A.C. input terminals 4c , the positive diodes 4a , the positive cable 17, the diode 9, the first stationary contactor 7c , the movable contactor 7b , the field winding 8 and the diode 11 to the neutral point 3, thus increasing the power supply to the field winding 8 in addition to the power supply from the battery 5. And then due to the further increase of the rotational speed when the average voltage potential at a point $P_1$ energized by the output voltage at the neutral point 3 becomes higher than the positive battery voltage and the average voltage potential at a point $P_2$ becomes lower than the negative battery voltage, namely, when the voltage potential difference between the positive and negative terminals of battery 5, this voltage potential difference between $P_1$ and $P_2$ is applied across the field winding 8 during the period when the movable contactor 7b is engaged with the first stationary contactor 7c , whereby a larger output power is obtained from the AC generator 1.

Here, it should be noted that the power supply to the field winding 8 developed by the voltage at the neutral point 3 through the diodes 10 and 11 is not influenced by the voltage regulating system 7 since voltage regulating coil 7a is not controlled by that neutral point voltage. That unregulated neutral point power supply to the field winding is electrically independent or separate from the battery power supply from which is so influenced by the voltage regulating system 7 that the voltage of the battery power supply is kept at the regulated value controlled by the voltage regulating system 7.

The difference regarding the additional unregulated neutral point power supply for the field winding will be more apparent in comparison with the conventional generator exemplified in the aforesaid U.S. Pat. No. 3,641,374. in which all of the power supply to the field winding is obtained from the battery always through a voltage regulator, whereby the voltage potential of the power supply is defined at the regulated value controlled by the voltage regulator.

Explaining this performance more concretely with the help of mathematical figures, the output current of the AC generator increase theoretically by 30% in proportion to the increase of 30% of the field current, depending on a certain kind of amplifying operation which is realized by the mutual induction between the field winding and the output winding. However, in fact, the output current increases by 25% in respect to the increase of 33% of the field current due to the influence of saturation of the magnetic force in the field winding and/or the output winding. This is proved by the experimental result shown in FIG. 3, wherein generator output current $I_B$ in amperes A is plotted against generator rotational speed N in R.P.M. for a field current of 3 A (dash curve) and of 4 A (solid line curve). When there is an increase from 3 A to 4 A (an increase of 33%) in the field current at the rotational speed of 5,000 R.P.M., an increase from 40 A to 50 (an increase of 25%) in the output current $I_B$ is measured.

Figure 3:
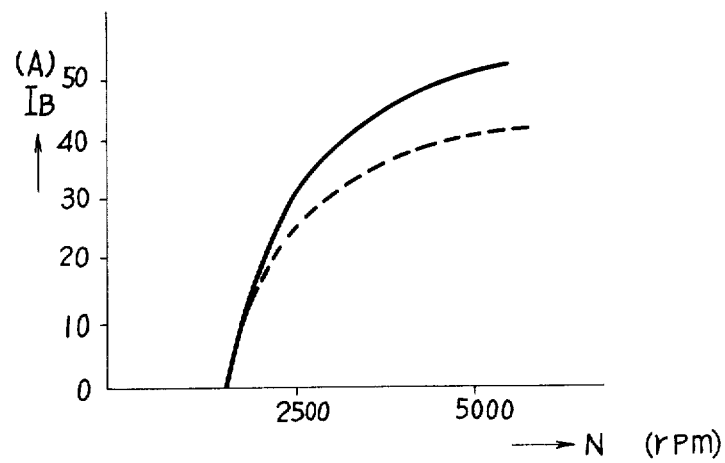
FIG. 3 is a characteristic curve showing the change of the output power.

In FIG. 3, the solid line designates the output current according to the present invention and the dotted line designates the output current obtained by an AC generator in which the voltage appearing at the neutral point is not supplied to the field winding.

Figure 4:
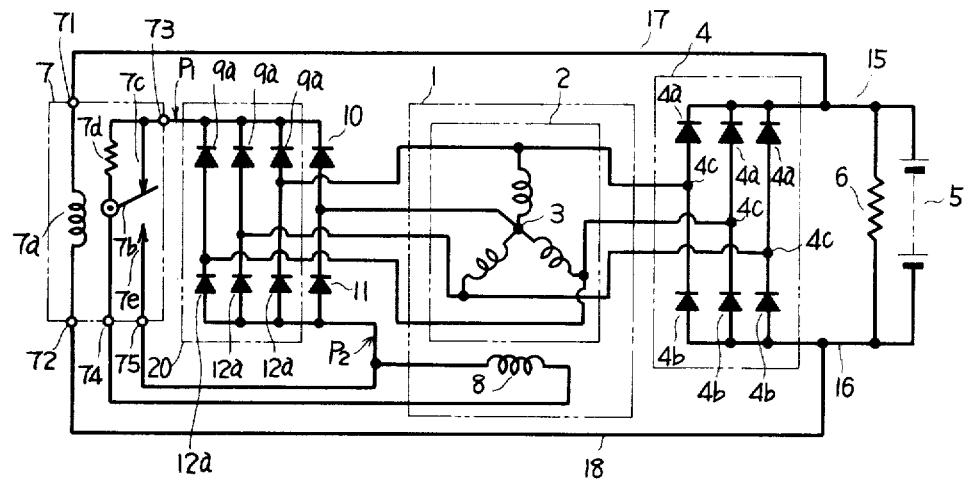
FIG. 4 is an electric circuit diagram showing a second embodiment according to the present invention.

FIG. 4 shows a second embodiment according to the present invention, which differs from the first embodiment in FIG. 1 in that the power supply to the field winding 8 is carried by an additionally provided full-wave bridge rectifier 20 having positive diodes 9a and negative diodes 12a , which is also as well connected to the output winding 2 of the AC generator 1.

In operation, when the engine (not shown) starts to rotate, the AC generator 1 fixed thereto driven to rotate and to generate an alternating current. The initial excitation for the field in this embodiment is not carried out by the power supply to the field winding 8 from the battery 5 but carried by the residual magnetism of the core of the field winding 8. Once when the alternating current is generated at the generator 1, the current is rectified at the full-wave bridge rectifier 20, then the rectified current is supplied to the field winding 8 to continue the field excitation. Of course, at the initial excitation the movable contactor 7b is engaged with the first stationary contactor 7c. When the battery voltage exceeds a predetermined value the voltage winding 7a produces a sufficient electromagnetic force to seperate the movable contactor 7c thereby to decrease the output of the generator 1. Under the condition that the movable contactor 7b remains engaged with the first stationary contactor 7c, and when the voltage appearing at the neutral point 3 exceed the output derived from the full-wave bridge rectifier 20, as indicated by hatching in FIG. 2, due to the increase of the rotational speed of the AC generator 1, this increase of the output is supplied from the neutral point 3 through the diode 10, the contactor 7b, the field winding 8, the negative diodes 12a to the output winding 2 of the generator 1, or from the neutral point 3 through the output winding 2, the positive diodes 9a, the contactor 7c, the movable contactor 7b, the field winding 8, the diode 11 to the neutral point 3, whereby a larger output is obtained. Because this increased output supplied to the field winding 8 from the neutral point 3 is not limited at a value which is controlled by the voltage regulator 7 for controlling the battery voltage.

Figure 5:
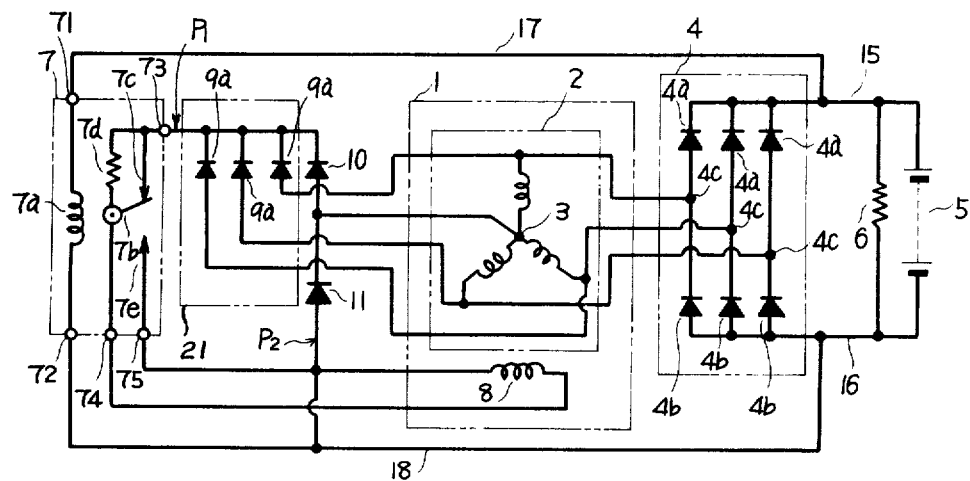
FIG. 5 is an electric circuit diagram showing a third embodiment according to the present invention.

FIG. 5 shows a third embodiment according to the present invention, which differs from the second embodiment in that an auxiliary rectifier 21 is provided. The auxiliary rectifier 21 includes a plurality of positive diodes 9a and forms a full-wave bridge rectifier network in combination with the negative diodes 4b of the bridge rectifier 4.

In operation, the initial excitation for the field is carried by the residual magnetism of the core of the field winding 8 to produce the alternating current at the generator 1 in accordance with the rotation thereof, and thereafter the power supply to the field winding is carried by the output of the generator 1 through the full-wave bridge rectifier network including the positive diodes 9a and the negative diodes 4b.

Under the condition that the movable contactor 7b remains engaged with the first stationary contactor 7c due to insufficient battery voltage, and when the voltage appearing at the neutral point 3 exceeds the output derived from the bridge rectifier network of positive diodes 9a and the negative diodes 4b, as indicated by hatching in FIG. 2, due to the high rotational speed operation of the generator 1, this increase of the output is supplied from the neutral point 3 through the diode 10, the contactor 7c, the movable contactor 7b, the field winding 8, the negative cable 18, the negative diodes 4b and to the output winding 2, or from the neutral point 3 through the output winding 2, the positive diodes 9a, the contactor 7c the movable contactor 7b, the field winding 8, the diode 11 to the neutral point 3, whereby a larger output is obtained due to uncontrolled high voltage power supply to the field winding from the neutral point.

What I claim is:

1. An electrical system comprising; a polyphase alternating current generator having a field winding and a three-phase Y-connected output winding;
   a three-phase full-wave bridge rectifier having direct current output terminals and AC input terminals connected with said output winding;
   a battery; a power supply circuit connecting said battery across said direct current output terminals;
   voltage regulating means including a field control device and voltage responsive means coupled to said field control device;
   means connecting said voltage responsive means across said battery;
   a pair of diodes providing field current supply terminals and having an input terminal connected with a neutral point of said Y-connected output winding;
   a field circuit including in series said field control device and said field winding; and
   field current supply circuit means separated from said power supply circuit for connecting said field circuit across said field current supply terminals for supplyong power from said neutral point only to said field winding.

2. An electrical system comprising;
   a polyphase alternating current generator having a field winding and a three-phase Y-connected output winding;
   direct current output terminals connected with said Y-connected output winding;
   a battery;
   a power supply circuit connecting said direct current output terminals with said battery;
   voltage regulating means including a field control device and voltage responsive means coupled to said field control device;
   means connecting said voltage responsive means across said battery;
   a field circuit including in series said field conrol device and said field winding;
   a first field supply circuit connecting said field circuit with said direct current output terminals;
   a pair of diodes providing field current supply terminals and having an input terminal connected with a neutral point and of said Y-connected output winding; and
   second field supply circuit means connecting said field circuit across said field current supply terminals for supplying power from said neutral point only to said field winding.

3. An electrical system comprising;
   a polyphase alternating current generator having a field winding and a three-phase Y-connected output winding;
   a three-phase full-wave bridge rectifier having direct current output terminals and AC input terminals connected with said output winding;
   a battery;
   voltage regulating means including a field control device and voltage responsive means coupled to said field control device;
   means connecting said voltage responsive means across said battery;
   a field circuit including in series said field control device and said field winding;
   a pair of diodes providing field current supply terminals and having an input terminal connected with a neutral point of said Y-connected output winding; and field current supply circuit means separated from said battery and connecting said field circuit across said direct current output terminals and also across said field current supply terminals for supplying power from said neutral point only to said field winding.

4. An electrical system according to claim 1 further comprising;
a second set of diodes, and
another field current supply circuit connecting said field circuit across said direct current output terminals through said second set of diodes.

5. An electrical system according to claim 2, wherein said direct current output terminals are energized by a three-phase full-wave bridge rectifier.

6. An electrical system according to claim 3 further comprising;
another full-wave bridge rectifier providing direct current output terminals across which said battery is connected.

7. An electrical system according to claim 3 further comprising;
a plurality of diodes providing in combination with a part of said full-wave bridge rectifier direct current output terminals across whihc said battery is connected.

8. An electrical system comprising;
a polyphase alternating current generator having a field winding and a three-phase Y-connected output winding;
a three-phase full-wave bridge rectifier having direct current output terminals and AC input terminals connected with said output winding;
a battery connected across said full-wave bridge rectifier;
voltage regulating means including a field control device and voltage responsive means coupled to said field control device;
means connecting said voltage responsive means across said battery;
a pair of diodes providing field current supply terminals and having an AC input terminal connecting with a neutral point of said Y-connected output winding;
means connecting said field winding across said field current supply terminals through said field control device for supplying power from said neutral point only to said field winding; and
means connecting said field winding across said direct current output terminals through said field conrol device.

9. An electrical system comprising;
a polyphase alternating current generator having a field winding and a three-phase Y-connected output winding;
a first three-phase full-wave bridge rectifier having direct current output terminals and AC input terminals connected with said output winding;
a battery connected across said first full-wave bridge rectifier;
voltage regulating means including a field control device and voltage responsive means coupled to said field control device;
means connecting said voltage responsive means across said battery;
a second three-phase full-wave bridge rectifier having field current supply terminals and AC input terminals connecting with said Y-conected output winding;
a pair of diodes connected across said field current supply terminals and having an input terminal connected wiht a neutral point of said Y-connected output winding; and
means connecting said field winding across said field current supply terminals through said field control device for supplying power from said neutral point only to said field winding.

10. An electrical system comprising;
a polyphase alternating current generator having a field winding and a three-phase Y-connected output winding;
a three-phase full-wave bridge rectifier having dirct current output terminals and AC input terminals connected with said Y-connected output winding;
a battery connected across said full-wave bridge rectifier;
voltage regulating means including a field control device and voltage responsive means coupled to said field control device;
means connecting said voltage responsive means across said battery;
a plurality of auxiliary diodes and three diodes of said bridge rectifier providing field current supply terminals;
a pair of diodes connected across said field current supply terminals and having an input terminal connected with a neutral point of said Y-connected output winding; and
means connecting said field winding across said field currrent supply terminals through said field control device for supplying neutral point power only to said field winding.

11. An electrical system comprising;
a polyphase alternating current generator having a field winding and a three-phase Y-connected output winding;
said output winding being constructed to be connected across a battery;
a first field supplying circuit inclduing said field winding for supply said field winding with field current from said Y-connected output winding;
a pair of diodes providing field current supply terminals and having an input terminal connected with a neutral point of said Y-connected output winding; and
a second field supply circuit including said field winding and connected across said field current supply terminals for supplying said field winding with field current by the voltage appearing at said field current supply terminals, said second field supply circuit being separated from said first field supply circuit.

* * * * *